May 27, 1952   H. F. MORLEY   2,598,413
STORAGE BUILDING AND MECHANISM FOR LOADING SAME
Filed May 5, 1950   3 Sheets-Sheet 1
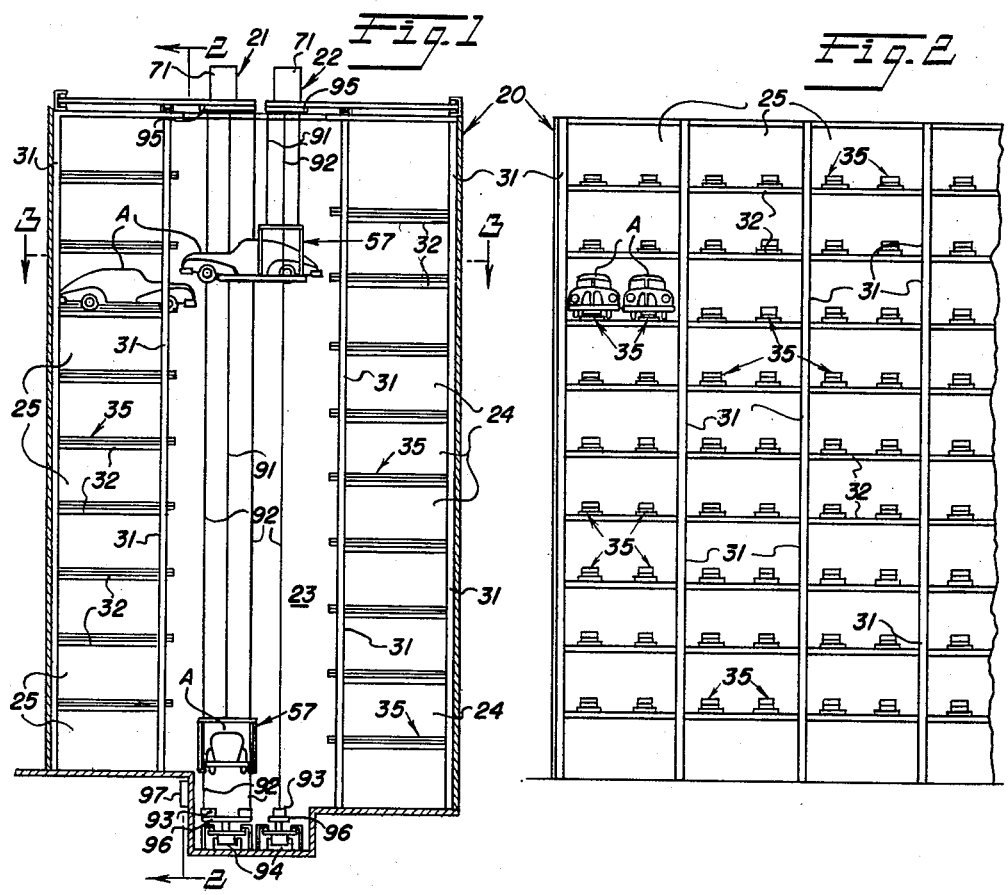
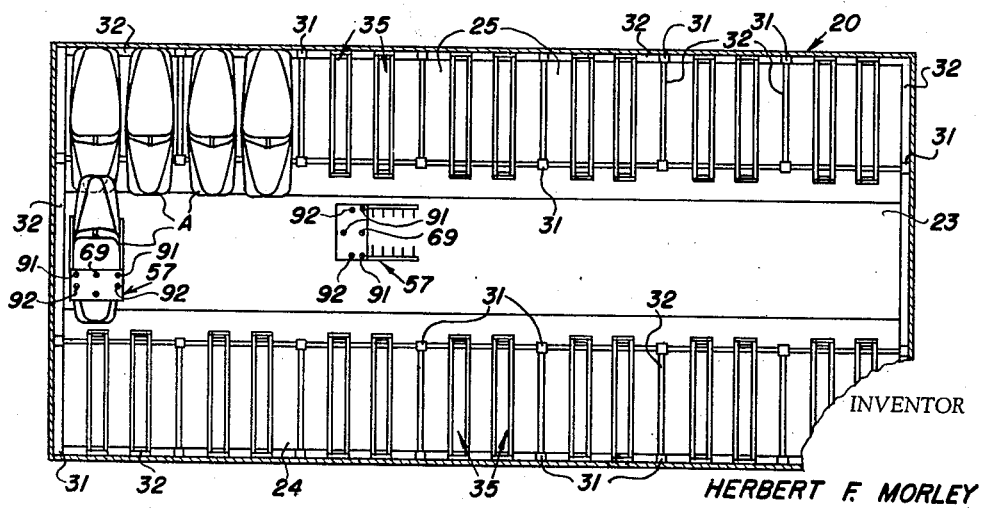
INVENTOR
HERBERT F. MORLEY
BY Strauch, Nolan & Diggins
ATTORNEYS.

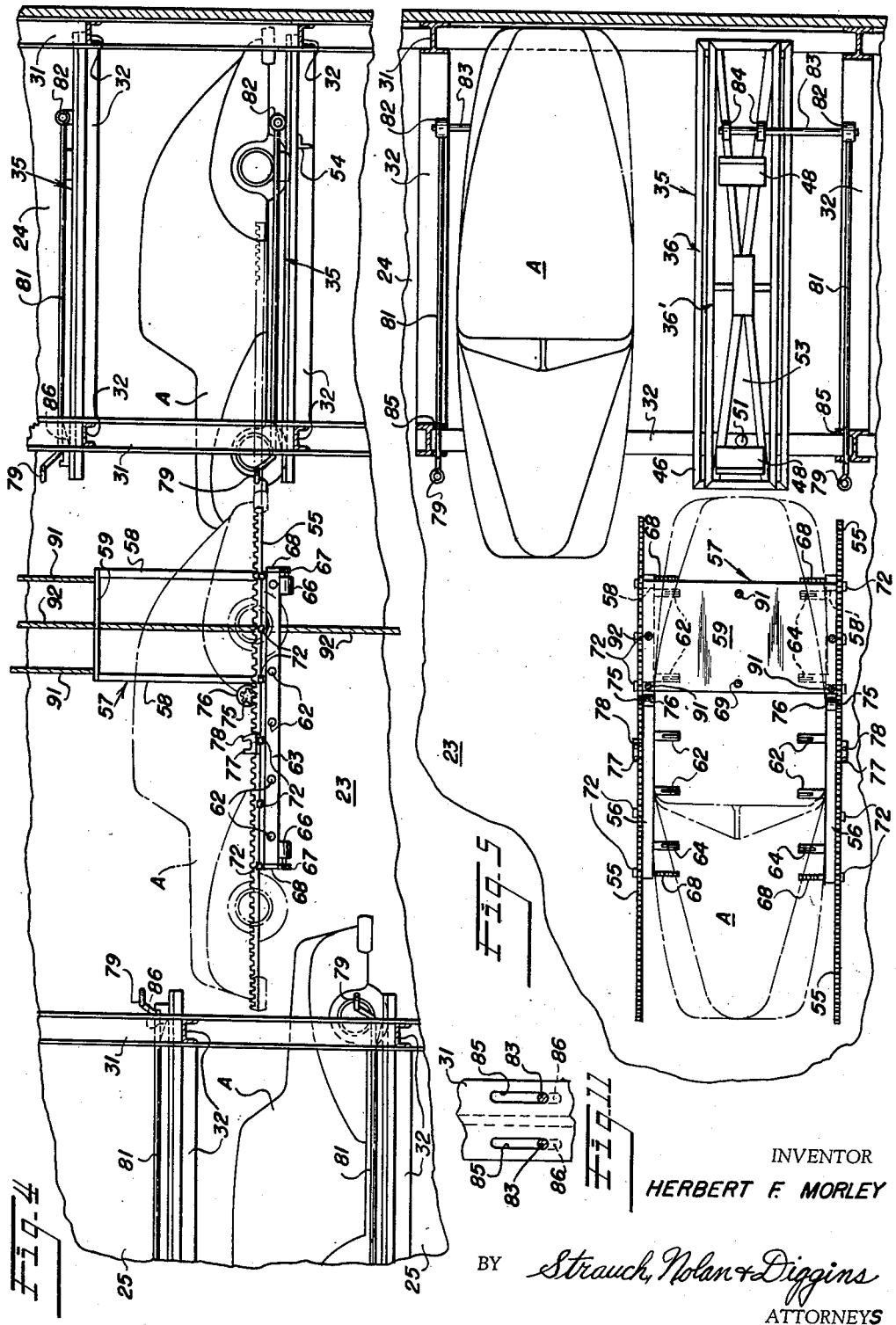

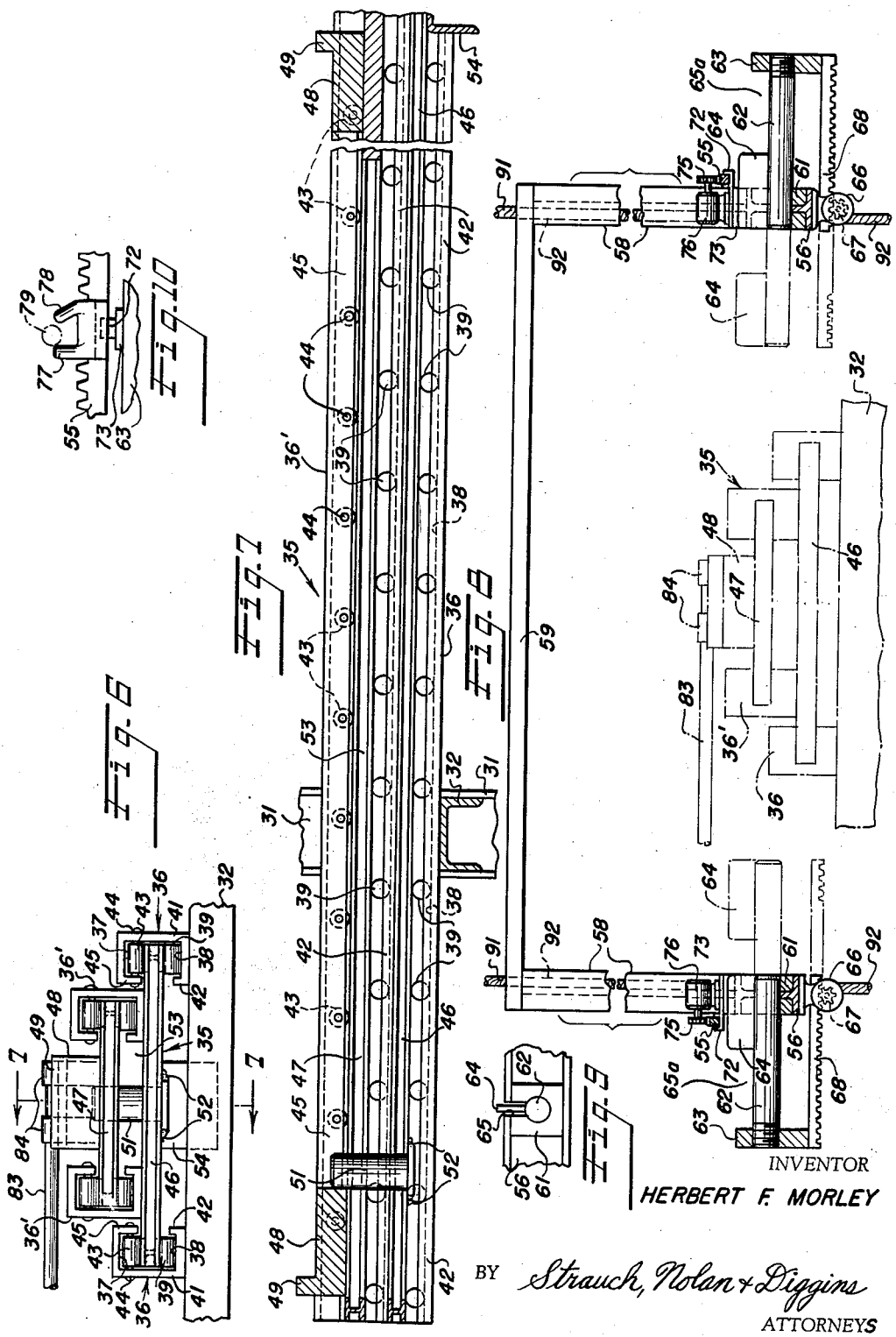

Patented May 27, 1952

2,598,413

UNITED STATES PATENT OFFICE 2,598,413

STORAGE BUILDING AND MECHANISM FOR LOADING SAME

Herbert F. Morley, Arlington, Va.

Application May 5, 1950, Serial No. 160,354

9 Claims. (Cl. 214—16.1)

The present invention relates to a novel building construction and more particularly to a novel storage building and handling mechanism for automatically storing relatively bulky goods such as automobiles, large packing cases, for example, the well known furniture storage packing cases forming removable bodies for truck trailers, and like goods.

While buildings of this general character have been previously proposed and some few have been constructed and put in use, the capital investment involved has been relatively high primarily due to the costly nature of the handling equipment employed and the limited capacity due to adherence to more or less conventional floor construction.

It, accordingly, is the primary object of this invention to provide a building structure composed of skeletonized support structure for the articles to be stored and mobile handling equipment designed to minimize duplication and equipment expense.

A more specific object of this invention resides in providing a building construction having storage bays arranged on opposite sides of a longitudinally extending elevator shaft wherein the storage levels of opposite bays are at staggered levels.

A further object of the present invention resides in providing a building structure having a longitudinally extending elevator shaft opening along its opposite sides onto superimposed tiers of storage bays with elevator structures supported by travelling crane structures for longitudinal movement along said elevator shaft to service a plurality of tiers.

Still another object of the present invention resides in providing a building having tiers of support bays opening onto an elevator shaft with skeletonized support structures in the form of movable carriers normally housed in said bays and adapted to be selectively projected into the elevator shaft into position to receive an article from the elevator and then deliver the article into its preselected bay.

Still another object of this invention is to provide a storage building composed of opposed tiers of storage bays arranged in side-by-side relation and separated by an elevator shaft with a travelling crane elevator structure mounted to be selectively rotated in one direction or the other to dispose an article thereon in position for delivery into a preselected bay.

A further object of the present invention resides in providing an automobile parking garage building unit of predetermined minimum dimensions transversely of a longitudinally extending elevator shaft of any desired height and length with opposed side-by-side tiers of storage bays normal to the longitudinal axis of said shaft and opening into said shaft along its longitudinal sides and a pair of travelling crane elevators adapted to travel longitudinally of said shaft along transversely spaced paths and service the one of said tiers nearest thereto.

Still another object of the present invention resides in the provision of an automobile parking garage building of maximum storage capacity having opposed side-by-side tiers of storage bays opening at their inner ends into a double width intermediate longitudinally extending elevator shaft providing a pair of transversely offset travelling crane elevators adapted to service the one of said tiers nearest thereto by delivering automobiles lengthwise to said bays back end first.

Further objects will appear as the description proceeds in connection with the appended claims and attached drawings wherein:

Figure 1 is a schematic sectional view taken just inside the front wall of a building constructed in accordance with this invention and designed to serve as an automobile parking garage;

Figure 2 is a schematic sectional view taken substantially on line 2—2 of Figure 1 showing how two automobiles are disposed in each storage bay;

Figure 3 is a schematic sectional view taken substantially on line 3—3 of Figure 1 and illustrating the floor plan and elevator operation provided for storing automobiles;

Figure 4 is an enlarged sectional view corresponding substantially to the section of Figure 1 and illustrating the elevator and carrier details at the level of the stored car of Figure 1;

Figure 5 is a fragmental plan view of Figure 4 viewed from above;

Figure 6 is an end elevational view of the storage carrier provided for use in connection with this invention;

Figure 7 is a sectional view taken on line 7—7 of Figure 6;

Figure 8 is a vertical sectional view through the elevator cab structure provided for use in this invention and illustrating in dot-dash lines the relative position of the storage carrier and elevator immediately after an automobile is deposited on the carrier;

Figure 9 is a detailed elevational view looking toward the free end of one of the support fingers of the cab structure of Figure 8;

Figure 10 is an enlarged detail view showing the details of the carrier pick-up finger provided on the elevator cab power withdrawal mechanism; and Figure 11 is a detailed elevational view illustrating the sliding guideway provided for the carrier push-pull rods.

With continued reference to the drawings wherein the same reference numerals are used throughout the several views to indicate the same parts, the storage building of the present invention is indicated by reference numeral 20. As here illustrated, the present invention is shown in connection with an automobile parking garage and contemplates two travelling crane elevator structures generally indicated by numerals 21 and 22 adapted to operate in offset side-by-side relation along a longitudinally extending elevator shaft 23 in a manner to be hereinafter pointed out.

Since the over-all length of the longest standard automobile body is slightly less than eighteen feet and as it is contemplated that the building will usually be constructed on a lot having a fifty foot frontage, the drawings illustrate a centrally disposed longitudinally extending elevator shaft thirteen feet four inches in width opening on opposite sides into storage bays or stalls eighteen feet in depth and arranged in tiers to the permissible building height, here indicated as eighty feet above ground. Since the average vertical dimension of modern automobiles approximates six feet, the vertical clearance in each bay is preferably maintained at a minimum to assure maximum capacity per square foot area of the building. The relatively narrow elevator shaft necessitates raising the automobile with its longitudinal axis parallel to the length of the elevator shaft and turning the elevator when it reaches the desired tier to position the automobile longitudinally with respect to its storage bay. It will be appreciated that an automobile disposed on the elevator and over thirteen feet four inches in length will of necessity protrude beyond the elevator shaft and have to swing over and under stored automobiles. To permit such swinging, the present invention proposes to store the automobiles in the storage bays with the hood end toward the elevator shaft and to swing the elevator so an automobile carried thereby will have its hood pass between the hood and wheels of superposed automobiles stored on the opposite side of the building. This is accomplished by arranging the storage bays 24 on one side in vertically staggered relation to the bays 25 on the other and providing a total vertical clearance between superposed automobiles of seven feet six inches, clearance sufficient to accommodate the hood to ground height of the swinging automobile and a stored automobile, which height in no case exceeds three feet six inches. This assures a three inch clearance between the hood of the swinging automobile and the wheels of the car directly above.

Adequate clearance between the swinging automobile and the stored automobile below is assured by taking advantage of the forward and rearward overhang of the body beyond the front and rear wheels. Since this overhang at the front end measured from axle center to front bumper is three and one-half feet and as the tire diameter never exceeds twenty-four inches, the free space between the front bumper and the forwardmost point of the front tire is about two and one-half feet. Substantially the entire two and one-half foot free space is available since the forward portion of the tire of the swinging automobile can pass over the front bumper of the stored automobile and in front of the hood of the stored automobile as shown in Figure 1. Assuming the swinging automobile to be the maximum length of two hundred thirteen inches (seventeen feet 9 inches) and allowing three inches clearance between the front tire of the swinging automobile and the hood of the stored automobile, the overhang of the swinging automobile over the stored automobile will be two feet three inches. As a consequence, the seventeen foot seven and one-half inch swinging automobile will extend completely across the thirteen foot four inch elevator shaft and two feet into the bay into which it is to be stored. Since the rearward overhang of the body beyond the rear axle is not less than four feet, it is obvious that the rear wheels will be disposed at least one foot within the vertical confines of the elevator shaft. It follows, therefore, that the rear wheels even during swinging movement of the elevator supported automobile will not extend appreciably into its storage bay. It follows, therefore, that if the elevator end of the storage carriers is normally disposed three feet beyond the storage bays there is no possibility of the carrier interfering with the swinging of the automobile supported by the elevator.

While any suitable building construction providing the clearances heretofore mentioned will suffice, the present invention contemplates a skeleton type construction for sake of economy. To this end, the present invention provides vertical steel supporting I-beams 31 connected end to end by any conventional means arranged in groups of four, one at each corner of a double storage bay, measuring longitudinally of the building fourteen feet between centers. As clearly shown in Figures 1 through 5 of the drawings, I-beams 31 are disposed with their flanges paralleling elevator shaft 23 and are tied together by horizontally disposed channel members 32 connected at their opposite ends to I-beams 31 in conventional manner. Referring for the moment to Figures 3 and 5, it will be seen that each double bay is defined on three sides by channel members 32 and that the I-beams 31 adjacent the elevator shaft 23 are set well back from the elevator shaft and are connected longitudinally of the building by horizontal channels 32. The lateral clearance between the bays 24 and 25 on opposite sides of the elevator shaft is maintained at approximately twenty-five feet eight inches, since each bay from the outside flange of the respective I-beams 31 in a lateral direction is fourteen feet and it is contemplated that the outer building wall may be shell-like and held to a four inch dimension since it will perform no load bearing function.

Each bay 24 and 25 is provided with a pair of storage carrier structures 35 suitably spaced longitudinally along the length of the building as shown in Figures 2 and 3. Each carrier is of identical construction and as shown in Figures 4 and 6 comprises a pair of oppositely facing channel bars 36 welded to channels 32 and providing vertically spaced upper and lower roller or needle bearing tracks 37 and 38. Lower tracks 38 are adapted to receive a suitable number of freely movable rollers or needles 39 held against axial disengagement by the vertical wall 41 of channel bar 36 and an upturned lip 42 on the lower flange elements of bars 36. While upper tracks 37 may be provided with any suitable roller or needle structures, it is contemplated that the upper rollers or needles 43 will rotate around a fixed axis provided by a transverse journal pin 44 mounted in suitable apertures in wall 41 and downturned lips 45 formed on the upper flanges of bars 36. This construction of the upper rollers is preferred to assure a construction wherein the upper rollers will be secured against accidental displacement in operation. It is to be understood, however, that any other suitable roller structure may be provided for the upper tracks 37.

The spaced pair of roller bearing tracks 37 and 38 of the opposed channel bars 36 are adapted to receive the respective longitudinal edges of an axially movable sub-support plate grill structure 46 having oppositely facing channel bars 36' identical to channels 36 welded thereto. The roller bearing tracks 37 and 38 of channels 36' similarly support a movable main support plate or grill structure 47 provided with suitably spaced support blocks 48 the outwardly facing edges of which are provided with upstanding lips 49 to prevent relative axial disassociating movement between the supported automobile and the main support plate. As clearly seen in Figures 6 and 7, plate 46 is provided with an upstanding pin 51 preferably welded at 52 to plate 46 and extending upwardly through space 53 extending longitudinally of main plate 47 for a predetermined distance. The upper end of pin 51 preferably protrudes above the upper surface of plate 46 so as to engage the ends of space 53 and limit the relative longitudinal movement of plates 46 and 47 for a purpose to be hereinafter pointed out. The undersurface of plate 46 is preferably provided with a transversely extending L-shaped channel member 54 adapted to engage channel 32 adjacent the elevator shaft, when plate 46 is in its extended position, to limit the extent of projection of plates 46 and 47 respectively toward and into the elevator shaft.

Movement of plates 46 and 47 is effected by means of a suitable power operated actuating rod 55, to be hereinafter described in detail, mounted on the base frame structure 56 of the elevator cars 57 each of which is identical in construction. While the elevators may assume any suitable form, the present invention contemplates an open bottom structure comprising a pair of longitudinally extending I-beams 56 spaced apart sufficiently to freely pass downwardly on either side of an automobile A as clearly shown in Figures 1, 4, and 5 and provided at one end with an open frame type cab structure formed by vertical I-beams 58 (Figures 4, 5 and 8) welded or riveted in conventional manner at their respective upper and lower ends to a roof plate 59 and the upper flanges of I-beams 56.

The opposite I-beams 56 are provided with longitudinally spaced transversely aligned bearing bosses 61 welded to the I-beam webs and providing through bores to respectively slidably receive elongated support pins 62 screw threadedly engaged in respective cross-head members 63. As clearly seen in Figures 5 and 8, the respective cross-head members 63 are disposed on the outer sides of I-beams 56 and the free ends of fingers 62 are provided with relatively thin upstanding support plates 64 extending longitudinally of pins 62 to which they are preferably secured by welding. Plates 64, as clearly seen in Figure 9, are adapted to freely pass through upwardly opening slots 65 formed in the uper flanges and webs of I-beams 56 and the upper portions of bearing bosses 61.

Referring to Figure 8, it will be seen that the plates 64 extend from the free ends of pins 62 to a point substantially spaced from cross-heads 63 and that the upper edges of plates 64 are disposed at a substantial height above the upper surface of pins 62. This construction provides a free space 65a between cross-heads 63 and the adjacent ends of plates 64. The dimensions of spaces 65a are sufficient to freely receive the depending portions of the body panelling of automobiles which have the body frame lying in a plane above the level of the body panelling in order that the upper edges of plates 64 may be brought into bearing contact with the frame structure when cross-heads 63 and pins 62 are projected inwardly into supporting position beneath an automobile to be lifted as shown in dot-dash lines in Figure 8.

Any suitable means may be provided to move cross-heads 63 and their associated pins 62 into and out of supporting position. For example, suitable reversible electric motors 66 (Figures 4 and 8) provided with pinion gears 67 may be mounted on the lower flange of I-beams 56 in position to cooperate with inwardly directed rack bars 68 secured to the underside of cross-heads 63 at their opposite ends. Since movement of cross-heads 63 and pins 62 takes place only when pins 62 are free of loads relatively small motors 66 will suffice for this purpose. Current for operating motors 66 is obtained from any available power source provided for the building and is transmitted to the motors through suitable extensible wiring cables 69 mounted on the elevator frame structure and extending upwardly to the travelling crane structures 71 (Figure 1).

Actuating rods 55 as clearly seen in Figure 8 comprise rack bars slidably supported in spaced bracket elements 72 supported in a plane above the top edges of support plates 64 by spacer plates 73 mounted at spaced intervals on the upper flanges of I-beams 56. As will be apparent from Figures 5 and 8, the rack teeth of rods 55 face upwardly and are adapted to mesh with pinion gears 75 of suitable reversible electric motors 76 also mounted on the upper flanges of I-beams 56. Motors 76 like previously described motors 66 receive their current from cables 69.

The rods 55 intermediate their ends are provided with upstanding axially spaced pick-up fingers 77 and 78, the fingers 78 being sloped as seen in Figure 10 to provide cam faces adapted to engage and vertically lift hook eyes 79 of push-pull rods 81 into engaged position between fingers 77 and 78. Rods 81 at the opposite ends are pivotally connected at 82 to laterally projecting arms 83 rigidly mounted on the rear ends of plates 47. While any suitable means may be used to secure arms 83 to plate 47, the present invention contemplates spaced mounting ears 84 (Figures 4 and 8) welded to plates 47 and projecting upwardly therefrom sufficiently to assure free passage of arms 83 in a plane above channel bars 36'. As clearly shown in Figures 5 and 11, rods 81 lie closely adjacent the side defining channel bars 32 of bays 24 and 25 and pass through vertically elongated slots 85 formed in the flanges of I-beams 31 at the elevator shaft end of bays 24 and 25 or in a suitable guide plate (not shown) secured to I-beams 31 in any well known manner.

Rods 81 are normally disposed at the lower end of slots 85 as shown in Figure 11 and are provided with depending locking lugs 86 adapted to engage behind the flanges of I-beams 31 to lock rods 81 and carrier plates 46 and 47 in their normal retracted position in bays 24 and 25. To assure ready return of rods 81 to their locked retracted positions the rearwardly facing edges of lugs 86 preferably slope rearwardly from their free ends forming cam surfaces to effectively cam rods 81 upwardly over the lower ends of slots 85 as rods 81 are pushed backwardly by actuating rods 55.

Referring for the moment to Figure 8, where carrier 35 is shown in dot-dash outline, it will be noted that the upper edges of plates 64 are disposed in a plane slightly below the plane of the supporting surfaces of blocks 48. This depicts the relative positions of the elevator and carrier immediately after the automobile has been deposited on carrier 35 and fingers 62 have been retracted from their load carrying position. In this position, rod 81 will be engaged by finger 77 and disposed in its lowermost position in slot 85. As a consequence, the outer ends of hooks 79 will be disposed in a vertical plane to clear fingers 78 so that upon lowering of the elevator to its turning position the fingers 77 and 78 will clear hooks 79.

The elevator cars 57 as clearly seen from Figures 1 and 4 are suspended in shafts 23 by cables 91, preferably three in number, as seen in Figures 4 and 5, each of which is secured in well known manner to power driven drums (not shown) housed in travelling crane structures 71. Suitable guide cables 92 having their upper ends secured to travelling crane structures 71 and their lower ends secured to tensioning winches 93 mounted on a follower travelling structure 94 at the bottom of shaft 23 are provided to maintain the elevators against sidesway during raising and lowering movement and longitudinal travelling movement along shafts 23. While the drawings herein illustrate two such cables 92 extending through suitably aligned apertures in base frames 56 and car top 59, it is to be understood that any suitable number of cables 92 may be provided and that guide eyes or the like may be removably secured to elevator cars 57 instead of provided aligned apertures.

It is to be understood that each travelling crane structure 71 and its associated follower structure 94 are provided with suitable power means to effect synchronous travelling movement along shaft 23 in any well known manner. Each unit 71 and its associated unit 94 are also provided with suitable power means to secure synchronous rotation of their respective turn plates 95 and 96 since elevator cars 57 are adapted to ascend and descend only when they are disposed with their longitudinal axes in longitudinal parallelism with shaft 23 and to be rotated into discharge position when they reach the desired storage level.

Control of the movement of elevator cars 57 along and up and down shaft 23, rotation of the respective elevator cars to position an automobile for delivery into a selected storage bay and into position to descend, timing of the operation of motors 66 and 76, and the elevator movements required to transfer an automobile to and from the various storage carriers is effected through a suitable push button control panel 97 (Figure 1) at ground level under control of a single attendant or even the customer himself where metered parking is desired. Since the construction and arrangement of suitable control circuits will be obvious to persons skilled in the art and forms no part of the present invention a detailed description is not believed necessary here. It is believed sufficient to point out that the controls, for the sake of safety, must be such that the two elevators cannot pass at the same level or unless both elevators are disposed in travelling position with respect to shaft 23 and must include control circuits for motors 66 and 76 that will prevent actuation of these motors unless the elevators are properly positioned with respect to the selected carrier.

Such control circuits may require conventional self-levelling mechanism which may be suitably associated with guide cables 92 and photoelectric cells suitably disposed on elevators 57 and the several storage carriers 35.

While the operation of the present invention may be varied as desired, a suitable operation believed to be obvious from the preceding description is as follows: An automobile or other object to be stored is driven by the owner or brought to a suitable entrance at one or the other ends of shaft 23. This starting point may be either a position within the building approximately at ground level at which an elevator car 57 can pick up the car or a position at ground level outside the building where a connection may be made to a suitable endless belt conveyor adapted to automatically move the automobile or other object to a pick-up station. Upon selection of an unoccupied storage carrier, indicated by suitable indicator lights, preferably in "off" condition to eliminate a false signal because of a faulty signal light, the pick-up starting button for the selected storage space is actuated. This causes the appropriate travelling crane elevator structure to move to the preselected pick-up station. When properly positioned suitably arranged photoelectric cells will close a control circuit to energize motor 66 and retract fingers 62 so the automobile or other article to be stored can be moved to pick-up position inside of base frame members 56. When in position pick-up fingers 62 automatically return to pick-up position, elevator car 57 ascends picking up the automobile or article and proceeds to the selected storage level where the self-levelling mechanism assures proper positioning vertically of shaft 23. The car 57 then moves longitudinally to the selected storage space where suitable photoelectric cells are effective to stop further travel of the car along shaft 23 and close the control circuit for initiating rotation of the travelling crane structure, follower structure, and elevator car to discharge position.

When the elevator car reaches its proper discharge position, further photoelectric cells come into play to stop rotation of the elevator and close a control circuit to initiate the transfer sequences first operating motor 76 to project rod 55 into coupled engagement with eyes 79 of pushpull rods 81. The elevator car then rises to a position to unlatch rod 81 and provide clearance for disposing the selected carrier 35 in transfer position under elevator car 57, a further set of photoelectric cells preferably determines this position of the elevator and initiates reversal of motor 76 to pull rod 81 and its associated carrier to transfer position.

Preferably a limit switch (not shown) disposed on one of the elevator base frame members 56 in position to be engaged by one of the rods 55 is provided to stop reversal of motor 76 and close a circuit to initiate downward movement of elevator car 57 to deposit the automobile or other article on the carrier 35. This downward movement of elevator car 57 is preferably terminated by a further set of photoelectric cells disposed respectively on carrier 35 and elevator base frame members 56. These same photoelectric cells close a control circuit to sequentially energize motors 66 and 76 to first effect retraction of fingers 62 and then return rods 81 and carrier 35 to latched position in the selected storage bay. Upon reaching the stored position, carrier 35 trips a limit switch which closes a control circuit for energizing motor 66 to return fingers 62 to supporting position and simultaneously lowers elevator car 57 to disengage finger 78 from eye 79 and return the elevator to the elevator rotating position. The elevator in then rotated to moving position and returned to its pick-up station or other predetermined idling location.

The removal of an article from a particular storage bay is effected by a reversal of the storage steps upon operation of a discharge push button which, in event of a customer operated parking or storage building, is connected in a circuit retained in open-circuit condition until coins to satisfy the meter are deposited. It is to be understood that the building details, the details of the elevator structures, the details of the storage carriers are given as examples only and may be widely varied within the scope of the present invention having for its objective the maximum utilization of ground space for storage purposes of bulky articles. In this connection, it will be appreciated that in the absence of a need for rapid loading and unloading of the building as required in parking garages, a single travelling crane elevator centered and operating in narrower elevator shaft so as to serve both tiers of storage bays will suffice.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An automatic storage building comprising a skeleton framework providing oppositely facing tiers of cubicle storage bays of predetermined uniform width, depth and height defined by vertically extending corner frame members and right angularly disposed, horizontally extending, vertically spaced sets of four frame members connected at their respective ends to said vertically extending frame members; an elevator shaft disposed between said oppositely facing tiers of storage bays and extending longitudinally from end to end and from bottom to top thereof; at least one travelling crane elevator structure supported from said oppositely facing tiers of storage bays and adapted to traverse said elevator shaft from end to end and top to bottom and having mechanism thereon adapted to automatically transfer an article to be stored from a loading or unloading station to said elevator; a pair of elongated article supporting carrier mechanisms in each bay disposed in side-by-side relation with their opposite ends supported by the lower horizontal frame members paralleling said elevator shaft and each comprising a pair of horizontally spaced channels connected to said lower horizontal frame members and disposed with their open sides facing each other and their upper and lower wall portions adapted to serve as roller tracks, upper and lower sets of rollers disposed in said channels, a support plate having its longitudinal edges supported between said upper and lower sets of rollers for limited longitudinal movement with respect to said channels, a pair of horizontally spaced channels connected to said support plate between said first mentioned channels and disposed with their open sides facing each other and their upper and lower portions adapted to serve as roller tracks, upper and lower sets of rollers disposed in said second mentioned channels, an article support plate having its longitudinal edges supported between said last mentioned upper and lower sets of rollers for longitudinal movement with respect to said last mentioned channels, a pick-up pin mounted in one of said plates and extending into a longitudinally extending free space in said other plate to limit relative movement of said plates, and means carried by said article support plate and adapted to be connected to a suitable power means to move said article support plate longitudinally whereby said article support plate may be moved relative to said support plate to the extent permitted by said pin and then will be moved together with said support plate to the permitted limited extent of movement of said support plate; and a master remote control panel at the ground level for controlling said elevator to bring it to a preselected station, then initiate operation of said elevator mounted mechanism to transfer an article to said elevator, and then move said loaded elevator to a predetermined station or bay and transfer the loaded article from the elevator to a selected carrier mechanism in said predetermined station or bay.

2. The combination defined in claim 1 wherein the under surface of said support plate adjacent the end remote from the elevator shaft is provided with an angle iron the depending flange of which is adapted to contact the lower horizontal frame member nearest the elevator shaft to limit the movement of said support plate.

3. An automatic automobile parking garage comprising a skeleton framework defining oppositely facing tiers of storage bays of predetermined uniform width, depth, and height, the levels of opposed bays being vertically staggered; an elevator shaft disposed between said oppositely facing tiers of storage bays and extending longitudinally from end to end and from bottom to top thereof and having a transverse width slightly greater than the combined width of two conventional automobile bodies; a pair of travelling crane elevator structures supported in side-by-side relation and having individual open bottomed cab structures adapted for traversing said elevator shaft from end to end and bottom to top; retractable supporting mechanism mounted on each of said cab structures at the level of the bottoms thereof and normally protruding inwardly from the sides of said cab structures toward the longitudinal center line thereof in position to engage the understructure of an automobile along its opposite sides to support said automobile; means for traversing said respective elevator cab structures along said shaft to an automobile receiving station and subsequently to a selected storage bay; means for selectively retracting the supporting mechanism of a selected elevator cab structure to non-supporting position to enable an automobile to be disposed within said cab structure at said receiving station and thereafter returning said supporting structure into position beneath said automobile whereby upon movement of said selected cab structure to said selected storage bay said selected elevator cab structure will pick up said automobile and carry it to a position in front of said storage bay; means for then rotating said selected cab structure and said automobile to dispose said selected cab structure and said automobile with their longitudinal axes normal to said shaft; a storage carrier in each bay, having latching means for automatically latching said carrier in storage position in its bay, adapted to be projected into said shaft beneath an automobile carried by said selected elevator cab structure whereby said automobile may be transferred from said selected elevator cab structure to said projected carrier; and power means on said selected elevator cab structure adapted to be projected into said bay to engage and move said carrier into projected position and thereafter return said carrier together with an automobile supported thereon into storage position in said bay and to unlatch said latching means as it is projected into said bay to engage said storage carrier.

4. An automatic automobile parking garage comprising a skeleton framework defining oppositely facing tiers of storage bays of predetermined uniform width, depth, and height, the levels of opposed bays being vertically staggered; an elevator shaft disposed between said oppositely facing tiers of storage bays and extending longitudinally from end to end and from bottom to top thereof and having a transverse width slightly greater than the combined width of two conventional automobile bodies; a pair of travelling crane elevator structures supported in side-by-side relation and having individual open bottomed cab structures adapted for traversing said elevator shaft from end to end and bottom to top and upper and lower track supported power driven crane cars disposed at the top and bottom of said shaft and adapted for synchronous longitudinal movement along said shaft; elevator suspending drum cables carried by the upper crane cars and adapted to be reeled and unreeled to raise and lower said cab structures; axially tensioned guide cables extending through guide eyes on said elevator cab structures and respectively connected at their upper and lower ends to said crane cars to guide said elevator cab structures in their raising and lowering movements; retractable supporting mechanism mounted on each of said cab structures at the level of the bottoms thereof and normally protruding inwardly from the sides of said cab structures toward the longitudinal center line thereof in position to engage the understructure of an automobile along its opposite sides to support said automobile; means for traversing said respective elevator cab structures along said shaft to an automobile receiving station and subsequently to a selected storage bay; means for selectively retracting the supporting mechanism of a selected elevator cab structure to non-supporting position to enable an automobile to be disposed within said cab structure at said receiving station and thereafter returning said supporting structure into position beneath said automobile whereby upon movement of said selected cab structure to said selected storage bay said selected elevator cab structure will pick up said automobile and carry it to a position in front of said storage bay; means for then rotating said selected cab structure and said automobile to dispose said selected cab structure and said automobile with their longitudinal axes normal to said shaft; a storage carrier in each bay adapted to be projected into said shaft beneath an automobile carried by said selected elevator cab structure whereby said automobile may be transferred from said selected elevator cab structure to said projected carrier; and power means on said selected elevator cab structure adapted to be projected into said bay to engage and move said carrier into projected position and thereafter return said carrier together with an automobile supported thereon into storage position in said bay.

5. The combination defined in claim 4 wherein said upper and lower crane cars each comprises rotating plate structures to which said raising and lowering cables and said guide cables are connected to assure rotation of said elevator cab structures and said cables as a unit.

6. An automatic automobile parking garage comprising a skeleton framework defining oppositely facing tiers of storage bays of predetermined uniform width, depth, and height, the levels of opposed bays being vertically staggered; an elevator shaft disposed between said oppositely facing tiers of storage bays and extending longitudinally from end to end and from bottom to top thereof and having a transverse width slightly greater than the combined width of two conventional automobile bodies; a pair of travelling crane elevator structures supported in side-by-side relation and having individual open bottomed cab structures adapted for traversing said elevator shaft from end to end and bottom to top; retractable supporting mechanism mounted on each of said cab structures at the level of the bottoms thereof and normally protruding inwardly from the sides of said cab structures toward the longitudinal center line thereof in position to engage the understructure of an automobile along its opposite sides to support said automobile; means for traversing said respective elevator cab structures along said shaft to an automobile receiving station and subsequently to a selected storage bay; means for selectively retracting the supporting mechanism of a selected elevator cab structure to non-supporting position to enable an automobile to be disposed within said cab structure at said receiving station and thereafter returning said supporting structure into position beneath said automobile whereby upon movement of said selected cab structure to said selected storage bay said selected elevator cab structure will pick up said automobile and carry it to a position in front of said storage bay; means for then rotating said selected cab structure and said automobile to dispose said selected cab structure and said automobile with their longitudinal axes normal to said shaft; a storage carrier in each bay adapted to be projected into said shaft beneath an automobile carried by said selected elevator cab structure whereby said automobile may be transferred from said selected elevator cab structure to said projected carrier and comprising cooperating pairs of sub-support roller trackways secured to said skeleton frame structure in horizontally spaced side-by-side relation, a sub-support plate slidably supported in said sub-support trackways for limited longitudinal projection therefrom, cooperating pairs of main support roller trackways secured to said sub-support plate in horizontally spaced side-by-side relation for movement therewith, and a main support plate slidably supported in said main support trackways for limited longitudinal projection therefrom; and power means on said selected elevator cab structure adapted to be projected into said selected bay to engage and move said carrier into projected position and thereafter return said carrier together with an automobile supported thereon into storage position in said selected bay.

7. The combination defined in claim 6 wherein said main support plate is provided with a push-pull rod extending longitudinally of said plate in position to be engaged by said power means on said elevator cab structure whereby said main support plate may be moved longitudinally of said main support trackways and said main support plate and said sub-support plate are connected by a lost motion connection comprising a pick-up pin adapted upon maximum projection of said main support plate from said main support trackways to engage said sub-support plate whereby upon continued operation of said power means said sub-support plate together with said main support plate will be moved longitudinally of said sub-support trackways to the limit of movement of said sub-support plate to position said storage carrier in projected supporting position in said elevator shaft.

8. An automatic automobile parking garage comprising a skeleton framework defining oppositely facing tiers of storage bays of predetermined uniform width, depth, and height, the levels of opposed bays being vertically staggered; an elevator shaft disposed between said oppositely facing tiers of storage bays and extending longitudinally from end to end and from bottom to top thereof and having a transverse width slightly greater than the combined width of two conventional automobile bodies; a pair of travelling crane elevator structures supported in side-by-side relation and having individual open bottomed cab structures adapted for traversing said elevator shaft from end to end and bottom to top and each comprising a pair of laterally spaced base frame members, vertically upwardly extending side frame members supported on each of said base frame members, a laterally extending top plate structure top plate structure connecting the upper ends of said side frame members, a plurality of longitudinally spaced, normally inwardly extending sets of supporting fingers respectively slidably supported in each base frame member and mounted at their respective outer ends in respective longitudinally extending cross-head members adapting said respective sets of supporting fingers for unitary lateral sliding movement with respect to the respective base frame members, and respective power operated rack and pinion assemblies carried by the respective base frame and cross-head members for effecting lateral sliding movement of said respective sets of fingers; retractable supporting mechanism mounted on each of said cab structures at the level of the bottoms thereof and normally protruding inwardly from the sides of said cab structures toward the longitudinal center line thereof in position to engage the understructure of an automobile along its opposite sides to support said automobile; means for traversing said respective elevator cab structures along said shaft to an automobile receiving station and subsequently to a selected storage bay; means for selectively retracting the supporting mechanism of a selected elevator cab structure to non-supporting position to enable an automobile to be disposed within said cab structure at said receiving station and thereafter returning said supporting structure into position beneath said automobile whereby upon movement of said selected cab structure to said selected storage bay said selected elevator cab structure will pick up said automobile and carry it to a position in front of said storage bay; means for then rotating said selected cab structure and said automobile to dispose said selected cab structure and said automobile with their longitudinal axes normal to said shaft; a storage carrier in each bay adapted to be projected into said shaft beneath an automobile carried by said selected elevator cab structure whereby said automobile may be transferred from said selected elevator cab structure to said projected carrier; and power means on said selected elevator cab structure adapted to be projected into said bay to engage and move said carrier into projected position and thereafter return said carrier together with an automobile supported thereon into storage position in said bay.

9. The combination defined in claim 8 wherein each of said supporting fingers at its inner free end is provided with an upwardly extending axially elongated support element adapted to extend upwardly behind the depending body portion of an automobile to be lifted to engage the automobile frame structure.

HERBERT F. MORLEY.

REFERENCES CITED

The following references are of record in the file of this patent:

UNITED STATES PATENTS

| Number | Name | Date |
| --- | --- | --- |
| 349,870 | Woodward | Sept. 28, 1886 |
| 972,755 | De Canio | Oct. 11, 1910 |
| 1,288,567 | Hall | Dec. 24, 1918 |
| 1,594,368 | Jacobs | Aug. 3, 1926 |
| 1,779,998 | Beecher et al. | Oct. 28, 1930 |
| 1,797,082 | Fougner | Mar. 17, 1931 |

FOREIGN PATENTS

| Number | Country | Date |
| --- | --- | --- |
| 283,324 | Italy | Mar. 7, 1931 |